Sept. 20, 1971     F. BROADBENT     3,606,147

SEPARATOR

Filed Dec. 29, 1969

INVENTOR:
FRANK BROADBENT
BY
Beveridge + DeGrandi
Attorneys

3,606,147
SEPARATOR

Frank Broadbent, Thongsbridge, England, assignor to Thomas Broadbent & Sons Limited, Huddersfield, England
Filed Dec. 29, 1969, Ser. No. 888,742
Claims priority, application Great Britain, Dec. 16, 1969, 61,120/69
Int. Cl. B04b *1/00, 11/00*
U.S. Cl. 233—29                                                4 Claims

ABSTRACT OF THE DISCLOSURE

A centrifugal machine comprising a bowl or tank having a plurality of guides therein defining a number of feed paths therebetween, alternate feed paths being closed at their upper end to provide a plurality of open and closed feed paths arranged alternately, a perforated slurry infeed pipe for introducing slurry to be separated into said bowl or tank and a spilling lip and opening for allowing removal of separated liquor component from each closed feed path.

---

The present invention relates to an improved centrifugal machine for separating a slurry into a light liquor component and a solid or heavy liquor component. The invention also relates to classification of liquor borne solids.

The invention finds particular application in so-called disc-type centrifugal machines in which separation is assisted by the provision of conical, corrugated, convex or concave discs. The invention also finds application in gravity settling tanks in which slurry separation is assisted by the provision of a plurality of inclined liquor-guiding surfaces.

According to the present invention there is provided a separator comprising a vessel having a plurality of guides therein defining a number of feed paths therebetween, alternate feed paths being closed at their radially inward end to provide a plurality of open and closed feed paths arranged alternately, means for introducing slurry to be separated into said bowl or tank and means for allowing removal of separated liquor component from each closed feed path.

According to a first aspect of the invention there is provided a centrifugal machine comprising a rotatable bowl having a plurality of truncated conical discs therein defining a number of feed paths therebetween, alternate feed paths being closed at their radially inward end to provide a plurality of open and closed feed paths arranged alternately, means for introducing slurry to be separated substantially uniformly into said bowl along the inner ends of said discs, and an interconnection for connecting each closed feed path for removing a liquor component of the slurry.

Conveniently the interconnection comprises a ferrule connected at the smaller diameter end of each closed feed path. Preferably the means for introducing the slurry comprises a perforated slurry infeed pipe.

According to a second aspect of the present invention there is provided a gravitational settling tank comprising a tank having a plurality of guides therein defining a plurality of feed paths therebetween alternate feed paths being closed at their upper end to provide a plurality of open and closed feed paths arranged alternately, means for introducing slurry to be separated substantially uniformly across the surface of said tank, and means for allowing removal of a liquor component of the slurry.

Conveniently the means for removing the liquor component comprises a manifold arrangement which is connected to the upper end of each closed feed path.

Preferably the means for introducing a slurry comprises a perforated slurry infeed pipe.

It is an object of the present invention to provide a separator in which incoming slurry does not cross or disturb the flow of previously separated liquor.

Other and further objects will be apparent from the following description taken in conjunction with the annexed sheet of drawings, wherein:

FIG. 4 is a top view of the centrifugal machine shown in FIG. 2.

Figure 1:
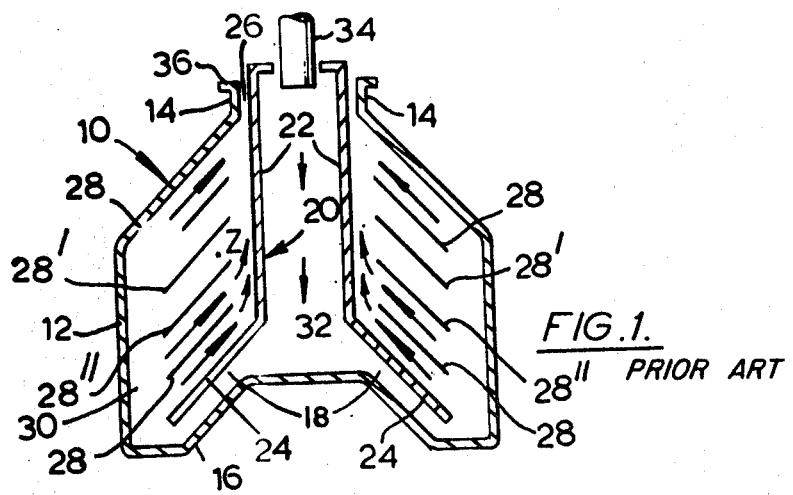
FIG. 1 is a diagrammatic illustration of a centrifugal machine according to the prior art.

FIG. 1 depicts a prior art centrifugal machine. FIG. 1 shows a rotatably mounted centrifuge bowl generally as 10 having a cylindrical side wall 12 tapering to a restricted neck portion 14. The base of the bowl 10 is inwardly profiled in its centre region to define a tapered peripheral wall 16 which constitutes one wall of a slurry inlet passage 18. An insert 20 is included within the bowl 10. The insert is in the form of an inverted funnel, having a cylindrical section 22 which locates within the neck portion 14 and an outwardly tapering funnel section 24 which constitutes the other wall of the slurry inlet passage 18. An annular passage 26 is defined between the neck portion 14 and the cylindrical section 22 and this serves as a light liquor outlet passage.

A plurality of conical discs 28 are mounted within the bowl 10 by any suitable means (not shown). The discs 28 are spaced from both the cylindrical side wall 12 of the bowl 10 and the cylindrical section 22 of the insert 20 to define two annular chambers 30 and 32 respectively.

A slurry infeed pipe 34 is fixed so that an end part thereof enters into the insert 20 and allows slurry to be fed down the cylindrical section 22 into the slurry inlet passage 18.

In operation, the machine is brought up to centrifuging speed by an electric motor (not shown) and slurry introduced from the infeed pipe 34. The slurry falls to the base of the bowl 10 and passes along the slurry inlet passage 18 and in the direction of the arrows. At the end of passage 18 the slurry divides and passes between adjacent conical discs 28.

The separation action of the centrifuge will be best understood with reference to one location, designated Z, between an upper disc 28' and a lower disc 28". At Z, the solid particle component of the slurry separates out and passes substantially radially outwardly to the underside of disc 28'. Thereafter the slurry travels down the underside of disc 28' and leaves the disc at its periphery. The solid particle component passes across the annular chamber 30, against the passage of an upward moving slurry stream, to the cylindrical side wall 12, where the component collects.

On the other hand, the liquor component at Z travels substantially radially inwardly until it meets the upper surface of disc 28". The liquor component then travels up the upper surface of disc 28", thence upwards through chamber 32 to be discharged over a spilling lip 36 on the neck portion 14.

The machine is periodically stripped down to remove solid particles from the cylindrical walls 12.

It will be seen that immediately the solid particle contact leaves the periphery of disc 28' it has three velocity components:

(1) A horizontal velocity which has been imparted by rotation of the bowl 10 and disc 28' and this velocity deposits the particles on the bowl 10.

(2) A vertically upward velocity imparted by the drag of the upward rising stream of incoming slurry in the annular chamber 30, and (3) A small downward velocity due to gravity which may for practical purposes be ignored.

It will be seen that the effect of the above features is highly undesirable, since the separated solid particle component must cross the chamber 30 giving rise to interaction with incoming slurry and consequently power loss.

Furthermore, using known centrifugal machines all the incoming slurry is introduced at the base of the bowl along one slurry inlet passage.

Figure 2:
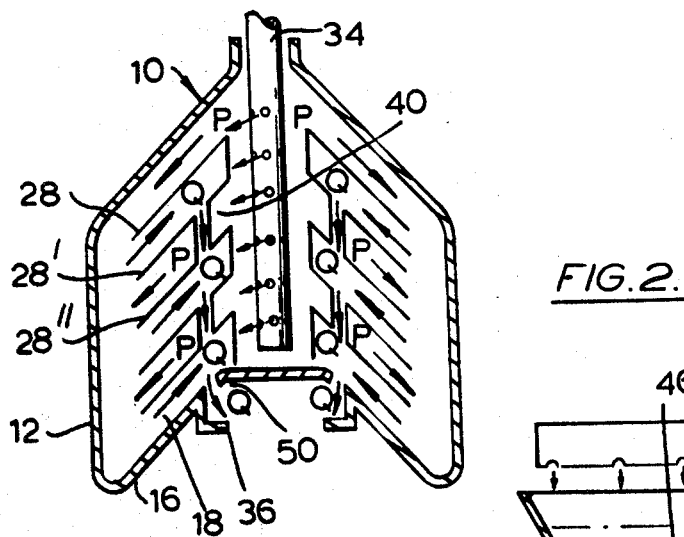
FIG. 2 is a diagrammatic illustration of a centrifugal machine embodying the present invention.

FIG. 2 shows the first embodiment of the present invention wherein like reference numerals have been used to designate like parts with those of FIG. 1. FIG. 4 is a top view of the embodiment of the invention shown in FIG. 2.

Unlike the prior art of FIG. 1 in the embodiment shown in FIG. 2 no insert 20 is provided and the slurry infeed pipe 34 extends to the base of the bowl 10. The infeed pipe 34 is perforated along the length of the pipe within the bowl 10, and each of the perforations acts as a jet for slurry to be introduced into the bowl 10, for separation.

Alternate conical feed paths defined between successive discs 28, are closed at their inner ends, and a plurality of axial ferrules 40 as shown in FIGS. 2 and 4 connect those feed paths which have closed ends.

As distinct from the prior art arrangement of FIG. 1, the light liquor component is led away through an annular slot 50 formed in the tapered peripheral wall 16 at the base of the bowl 10. A spilling lip 36 is formed around the slot 50 in the manner of that illustrated in FIG. 1.

In operation the machine is brought up to centrifuging speed and slurry introduced down the feed pipe 34. By virtue of the perforations in the feed pipe, the slurry is supstantially uniformly distributed over the depth of the bowl 10, and the slurry level (not shown) is allowed to build up to a diameter slightly smaller than that of the inner diameter of the discs 28.

The slurry passes down the open feed paths, in the manner indicated by arrows P and separates into a solid particle component and a liquor component in known manner. The solid particle component moves outwardly under the influence of centrifugal force to be collected on the inner periphery of the bowl wall, as previously described. The liquor component however tends to move to a smaller diameter since its density is less than that of the solid particle component. Accordingly the liquor component follows the path marked by the arrows Q, up the closed feed paths, through the ferrules 40 and is removed from the base of the machine through the annular slot 50 and over the spilling lip 36.

If desired, each alternate disc 28 which forms the upper wall of the open feed path may be shortened to facilitate separation.

It will be seen that the flow path achieved by the present invention allows a more efficient separation of the solid particle component and the liquid component since the solid particle component leaving the outer diameter of the discs does not cross an incoming slurry stream.

Figure 3:
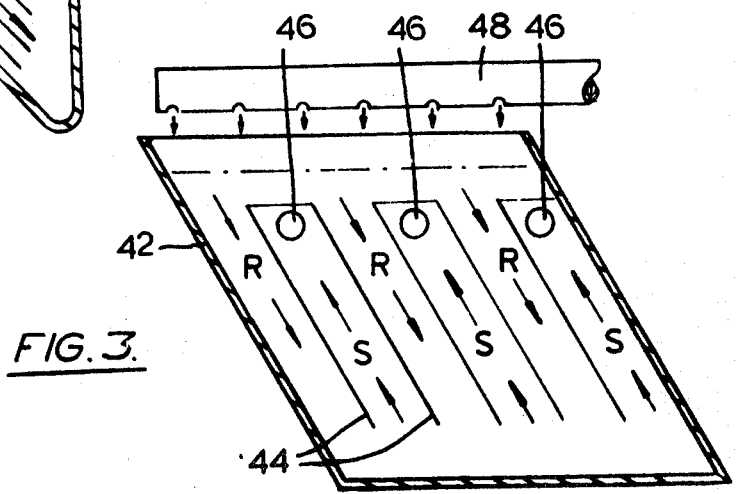
FIG. 3 is a diagrammatic sectional illustration of the centrifugal machine illustrated in FIG. 2.

The invention is not restricted to use on centrifugal machines, but is equally applicable to gravitational settling tank embodying the invention is illustrated in FIG. 3 to which reference is now made.

In FIG. 3, there is shown a gravitational separating tank 42 which tank includes a plurality of guides 44 which are angled with respect to the vertical axis as viewed. The guides 44 are substantially rectangular in shape. A plurality of feed paths are defined between successive guides 44 and alternate feed paths are closed at their upper ends. The closed feed paths each include an outlet aperture 46 connecting with a manifold arrangement (not shown) for leading the liquor component away from the tank. A perforated feed pipe 48 is provided for feeding slurry substantially uniformly across the separating tank 42.

In operation, slurry to be separated is uniformly distributed across the surface of the tank, by the feedpipe 48 and the level in the tank allowed to build up to just above the level of the guides 44. The slurry passes down the open feed paths in the manner indicated by arrows R. During its passage down the open feed paths, the slurry separates into a solid particle component and a liquor component in known manner.

The solid particle component falls under the influence of gravity to the base of the separating tank 42. On the other hand, the liquor component tends to rise since its density is less than that of the solid particle component. Accordingly, the liquor component rises up the closed feed paths as indicated by arrows S to the outlet apertures 46 when the liquor component is removed from the separating tank by the manifold arrangement.

It will be seen that the gravitational separating tank of the present invention allows a more efficient separation of the solid particle component and the liquor component since the solid particle component leaving the lower edge of the angled guides does not cross an incoming slurry stream.

If desired, the length of guide 44 between two adjacent feed paths R and S can be shortened to facilitate the separation of the light liquor component.

Again, if desired, the infeed pipe 48 can be replaced by a pipe which scans across the length of the separating tank to uniformly distribute the slurry over the tank's surface.

In an alternative embodiment still (not shown), a pipe is connected to each outlet aperture 46, and each pipe leads the separated liquor component away to a reservoir for collection. It will thus be seen that in this embodiment of the invention a manifold is not required.

Other and further modifications may be resorted to without departing from the spirit and scope of the invention as defined in the appended claims.

I claim:

1. A centrifugal machine comprising a centrifuge bowl having an axis, means for rotating said bowl about said axis, a plurality of conical discs arranged in said bowl, each disc having an annular axial opening in the center thereof, said discs defining a plurality of feedpaths, each feedpath being defined by the space between any given disc and the disc adjacent to said any given disc, a slurry infeed pipe passing through said annular openings and having perforations evenly distributed along its length to evenly distribute slurry among said plurality of feedpaths, means closing alternate feedpaths at their radially inner circumferences so that said alternate feedpaths are completely enclosed at their radially inner circumferences, thereby forming a plurality of conically shaped alternating open and closed feedpaths, interconnection means connecting each said closed feedpath to the next adjacent closed feedpath, said interconnection means leading to exit means for allowing material to leave said bowl, whereby slurry passing outwardly through said perforations in said infeed pipe passes radially outwardly along the conically shaped open feed paths and the separated liquor component passes through said closed feedpaths to said interconnection means and said exit means for removal from said bowl.

2. A centrifugal machine as recited in claim 1, wherein said interconnection means comprises ferrule means connected between each said closed feedpath near the inner circumference thereof.

3. A centrifugal machine as recited in claim 2, wherein said ferrule means comprises a plurality of axially directed pipes, each pipe connecting a closed feedpath with the next adjacent closed feedpath.

4. A centrifugal machine as recited in claim 3, wherein said exit means comprises an opening in the bottom of said bowl.

References Cited

UNITED STATES PATENTS

| 832,837 | 10/1906 | Bok | 233—21 |
|---|---|---|---|
| 1,469,522 | 10/1923 | Mackaye | 233—20 |

JORDAN FRANKLIN, Primary Examiner

G. H. KRIZMANICH, Assistant Examiner

U.S. Cl. X.R.

233—41, 47